United States Patent
Sarkar et al.

(10) Patent No.: US 7,404,025 B2
(45) Date of Patent: Jul. 22, 2008

(54) SOFTWARE PROGRAMMABLE DYNAMICALLY RECONFIGURABLE SCHEME FOR CONTROLLING REQUEST GRANT AND MASKING FOR ULTRA HIGH PRIORITY ACCESSOR DURING ARBITRATION

(75) Inventors: Soujanna Sarkar, W. Bengal (IN); Gregory R. Shurtz, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 145 days.

(21) Appl. No.: 11/279,698

(22) Filed: Apr. 13, 2006

(65) Prior Publication Data

US 2006/0242342 A1 Oct. 26, 2006

Related U.S. Application Data

(60) Provisional application No. 60/671,827, filed on Apr. 14, 2005.

(51) Int. Cl.
*G06F 13/00* (2006.01)
(52) U.S. Cl. .................... 710/244; 710/116; 710/123
(58) Field of Classification Search ................ 710/116, 710/123, 244, 262
See application file for complete search history.

(56) References Cited

U.S. PATENT DOCUMENTS

| | | | | |
|---|---|---|---|---|
| 5,560,016 | A | * | 9/1996 | Fiebrich et al. ............ 710/240 |
| 5,623,672 | A | * | 4/1997 | Popat ........................ 710/240 |
| 5,748,969 | A | * | 5/1998 | Lee et al. .................... 710/244 |
| 6,393,505 | B1 | * | 5/2002 | Scalise et al. ............... 710/107 |
| 6,654,833 | B1 | * | 11/2003 | LaBerge ..................... 710/107 |
| 2004/0153596 | A1 | * | 8/2004 | Monteiro ..................... 710/305 |
| 2005/0066094 | A1 | * | 3/2005 | Arramreddy et al. ........ 710/107 |
| 2005/0193156 | A1 | * | 9/2005 | Inoue et al. ................. 710/260 |
| 2006/0149874 | A1 | * | 7/2006 | Ganasan et al. ............ 710/110 |
| 2006/0248250 | A1 | * | 11/2006 | Sarkar et al. ................ 710/243 |

* cited by examiner

*Primary Examiner*—Glenn A Auve
(74) *Attorney, Agent, or Firm*—Robert D. Marshall, Jr.; W. James Brady; Frederick J. Telecky, Jr.

(57) ABSTRACT

A method for arbitration grants access to an ultra high priority device if the ultra high priority device requests access. This access is limited to a selectable number of accesses. Thereafter the ultra high priority device is masked from requesting access for a selectable interval of time during which access may be granted to other devices. The number of assess and the interval of masking are preferably controlled by memory mapped data registers loaded into dedicated counters.

13 Claims, 4 Drawing Sheets

SOFTWARE PROGRAMMABLE DYNAMICALLY RECONFIGURABLE SCHEME FOR CONTROLLING REQUEST GRANT AND MASKING FOR ULTRA HIGH PRIORITY ACCESSOR DURING ARBITRATION

CLAIM OF PRIORITY

This application claims priority under 35 U.S.C. 119(e)(1) to U.S. Provisional Application No. 60/671,827 filed Apr. 14, 2005.

TECHNICAL FIELD OF THE INVENTION

The technical field of this invention is arbitrating among plural service requesters for access to a service device.

BACKGROUND OF THE INVENTION

It is known in art to control access to a device via arbitration. In a typical system-on-chip (SoC), a system resource, such as a memory or peripherial, is shared by multiple accessors. In the field of this invention requesting devices typically have priorities relative to other requesting devices. The device with the higher priority is granted access. In many systems this priority is dynamically allocated. For example, the last requester to be granted access may be given the highest priority. On the other hand, priority may be statically assigned to permit a high priority requester to have its needed access. One of these may be given ultra high priority, meaning that the arbiter always gives this accessor priority over all others. In this case some control over the grant and masking of the ultra high priority request is typical to meet the bandwidth requirements of the ultra high priority accessor as well as for all the remaining accessors.

A common solution to this problem is periodically allocating a time slot for the ultra high priority requester. During this time period, no other requester is granted access to the resource. However, such a scheme is sensitive to the time alignment of the request and thus may not help in meeting the real time requirements. For the same reason, it may also waste bandwidth for the remaining requesters. Other solutions grant access to the ultra high priority accessor each time another requester completes one access. Thus the ultra high priority requester is sure to get access on a regular basis. This may not be sufficient to meet the real time requirements of the high priority requester and it may hurt the bandwidth requirements of other accessors. However, the user does not have control over resource allocation in both the above cases.

Thus there is a need in the art for a flexible scheme to control arbitration to allocate accesses to a shared resource by plural requesting devices.

SUMMARY OF THE INVENTION

This invention implements a software programmable dynamic scheme for controlling the granting and masking of the arbitration request of an ultra high priority requester. This invention allows the ultra high priority requester to have access to the shared resource for a programmable number of accesses based on the data access pattern. This invention masks this high priority requester for a programmable amount of time. This permits other requesters to meet their real time requirements.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
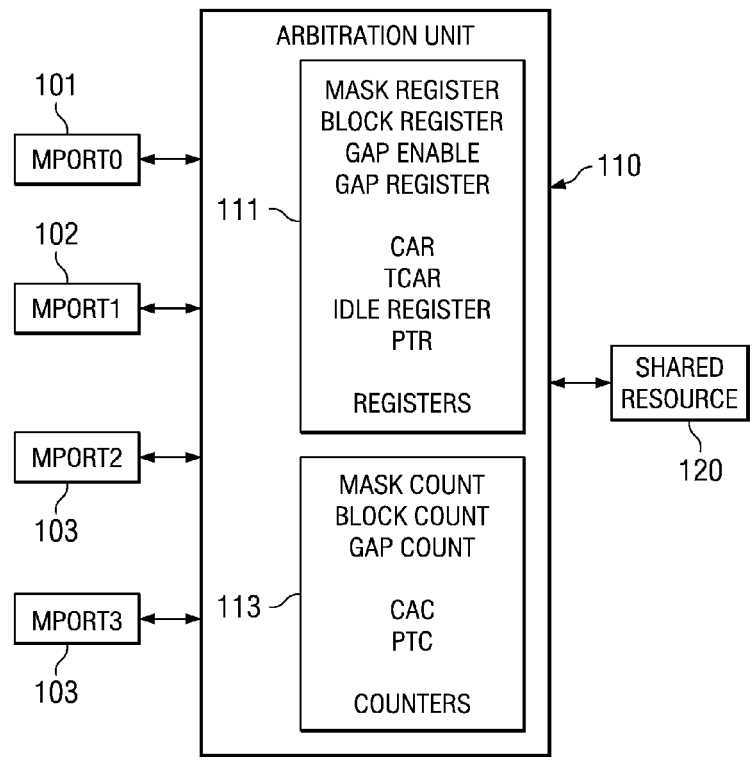
FIG. 1 illustrates this invention including plural access requesters whose access to a shared resource is controlled by an arbitrator.

FIG. 1 illustrates the plural requester devices and the arbitrator of this invention. The devices include Mport0 101, Mport1 102, Mport2 103 and Mport3 104. Each of these devices is connected to arbitration unit 110. Arbitration unit 110 receives access requests from devices 101, 102, 103 and 104 and selects one for access to shared resource 120. Arbitration unit 110 includes registers 111 and counters 113. Registers 111 include a mask register, a block register, a gap enable bit and a gap register associated with Mport0 101. Registers 111 include a consecutive access register (CAR), a time out consecutive access register (TCAR), an idle register and a priority time out register (PTR) associated with each of Mport1 to Mport 3. In the preferred embodiment these registers are memory mapped into the memory space of a data processor. Arbitration unit 110 grants access to one requesting Mport to shared resource 120.

Figure 2:
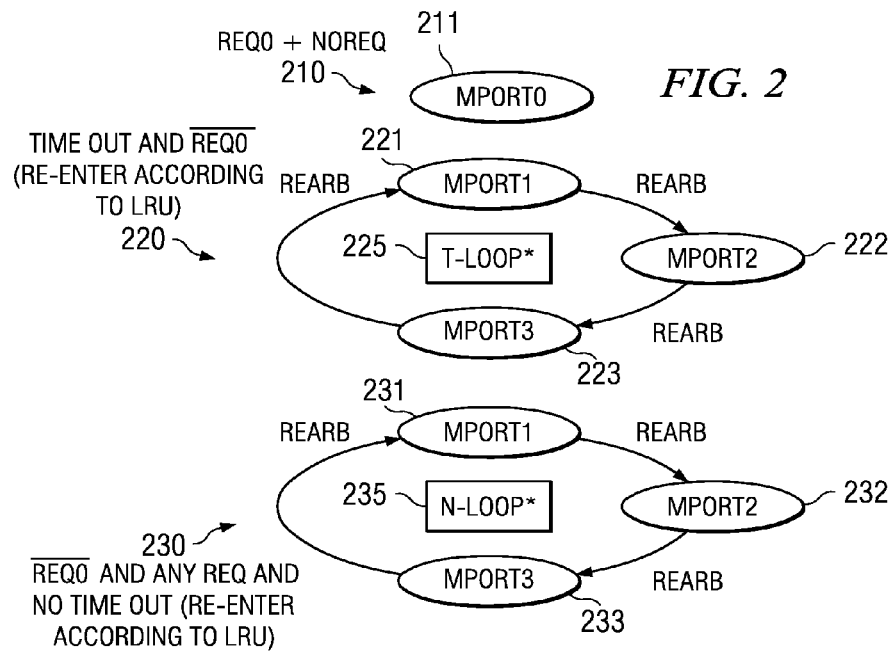
FIG. 2 illustrates the priority hierarchy according to this invention.

FIG. 2 illustrates the priority hierarchy of this invention. There are three levels of hierarchy: ultra priority 210; time out priority 220; and normal priority 230. In this example the ultra high priority level is limited to Mport0 101. Any of Mport1 102, Mport2 103 and Mport3 104 may have time out priority or normal priority depending upon current conditions. Priority within the time out priority 220 and the normal priority 230 is based upon a least recently used scheme.

Ultra priority level 210 is occupied solely by Mport0 101. Since there is only one device at this priority level there is no need to arbitrate between requesters. Any of mport1 to mport3 can be within time out priority level 220. Within time out priority level 220 access is granted to the requesting timed out device least recently serviced. This is illustrated schematically in FIG. 2 by the loop of Mport1 221, Mport2 222 and Mport3 223 around T-loop control 225. Any of Mport1 to Mport 3 can be at the default normal priority level 230. Within normal priority level 230 access is granted to the requesting device least recently serviced. This is illustrated schematically in FIG. 2 by the loop of Mport1 231, Mport2 232 and Mport3 233 around N-loop control 235. Arbitration unit 110 stores a two deep running history of the last two changes in granted Mport used in common within the time out priority level 220 and normal priority level 230.

Devices move into timeout priority level 220 based on per device programmable time out values. This time out value is stored in the corresponding priority time out register (PTR) within registers 111. Each device may perform a programmable number of accesses once they have been granted access. The number of accesses at the normal priority level 230 is stored in a corresponding consecutive accesses register (CAR) within registers 111. The number of accesses at the time out priority level (220) is stored in a corresponding time out consecutive accesses register (TCAR) within registers 111. Each Mport has an associated consecutive access counter (CAC) and a priority timeout counter (PTC) within counters 113 to control these functions.

The LRU priority keeps a running history of the last 2 changes in granted MPorts. In either the time out priority level 220 or the normal priority level 230 and when jumping between arbitration loops, the requesting master which has least recently gained access is always given the next access. In the timeout loop, only timed out ports are considered for arbitration, but still following the LRU priority. The default LRU history after reset is such that if all Mports were requesting, grants would initially occur in the following order MPort1, Mport2 and Mport3. MPort0 is a special case and always has ultra high priority level 210 when actively requesting. Time out priority level 220 is active whenever any Mport times out. Only requests from Mports which are currently timed out will be considered in this loop following the LRU scheme. Once all timed out Mports have been allowed an access and no timed out Mports are requesting, the scheme operates at the normal priority level 230 again honoring the LRU scheme.

Figure 3:
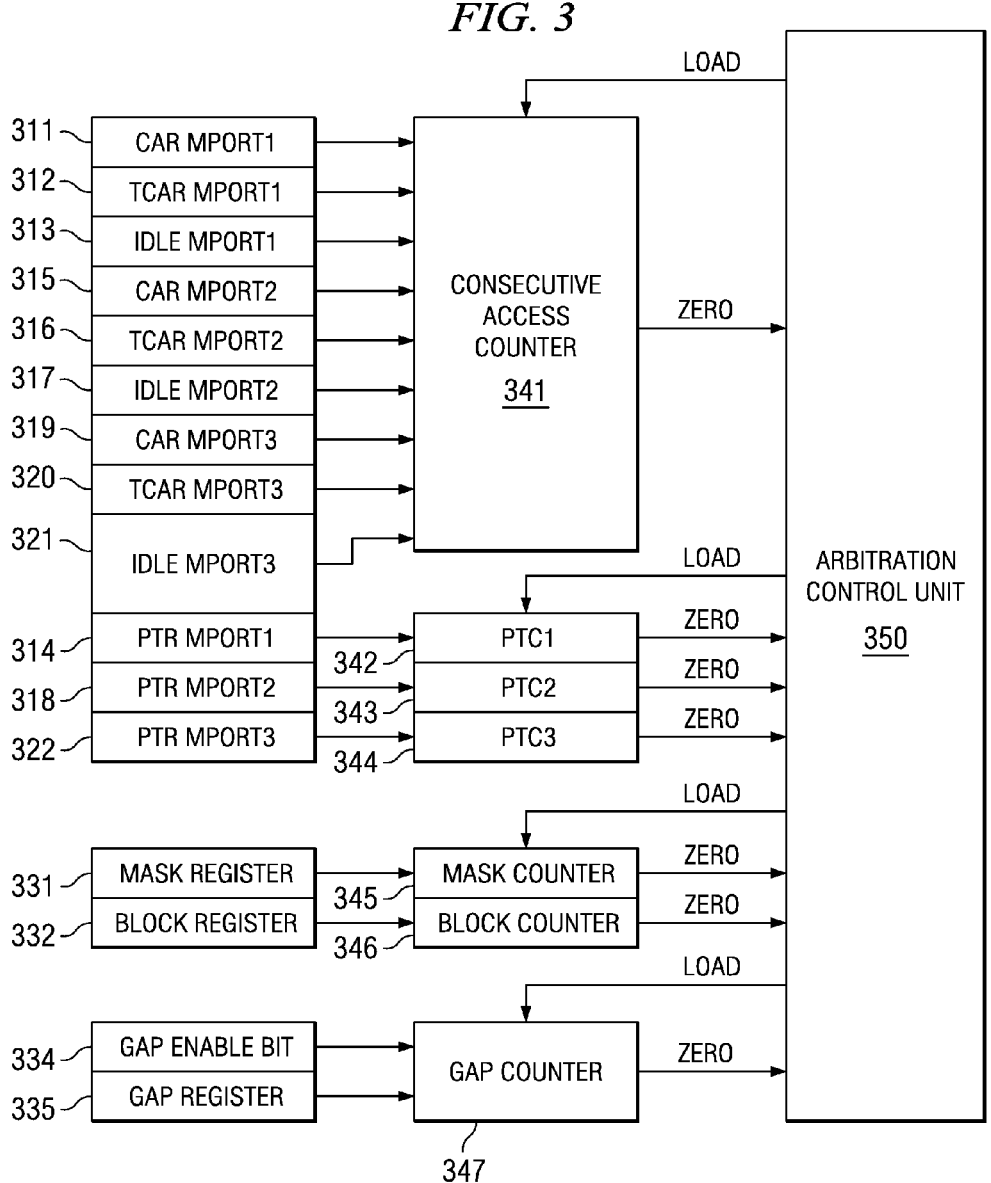
FIG. 3 illustrates some details of the arbitration unit illustrated in FIG. 2.

FIG. 3 illustrates some details of arbitration unit 110 of FIG. 2. FIG. 3 illustrates the registers of registers 111 and the counters of counters 113. Registers 111 includes some registers for Mport0 101 and some registers for each of Mport1 102, Mport2 103 and Mport3 104. Associated with Mport1 102 are consecutive access register (CAR) 311, time out consecutive access register (TCAR) 312, idle register (IDLE) 313 and priority time out register (PTR) 314. Associated with Mport2 103 are consecutive access register (CAR) 315, time out consecutive access register (TCAR) 316, idle register (IDLE) 317 and priority time out register (PTR) 318. Associated with Mport3 104 are consecutive access register (CAR) 319, time out consecutive access register (TCAR) 320, idle register (IDLE) 321 and priority time out register (PTR) 322. CARs 311, 315, 319, TCARs 312, 316 and 320 are loaded into consecutive access counter (CAC) 341 at appropriate times which will be explained below. Idle registers 313, 317 and 321 control the counting in consecutive access counter 341 in a manner more fully explained below. PTR register 314 is loaded into PTC1 342 when Mport1 generates an ungranted access request at the normal priority level 230. PTR register 318 is loaded into PTC2 343 when Mport2 generates an ungranted access request at the normal priority level 230. PTR register 322 is loaded into PTC3 344 when Mport3 generates an ungranted access request at the normal priority level 230. Mask register 331, block register 332, GAP enable bit 334 and GAP register 335 are associated with Mport0 101. Mask register 331 is loaded into mask counter 345 at appropriate times that will be more fully described below. Block register 332 is loaded into block counter 346 at appropriate times that will be more fully described below. GAP register 335 is loaded into GAP counter 347 at appropriate times when enabled by GAP enable bit 334.

The counters CAC 341, PTC 342, PTC 343, PTC 344, mask counter 345, block counter 346 and GAP counter 347 include an input corresponding to machine cycles. This could take the form of a clock signal controlling operation of the device including the arbitration mechanism of this invention. These machine cycles should be related to the minimum amount of access to shared resource 130. These counters count these machine cycles.

Arbitration control unit 350 controls the loading of CAC 341, PTC 342, PTC 343, PTC 344, mask counter 345, block counter 346 and GAP counter 347 via corresponding Load enable lines. Arbitration control unit 350 is responsive to count to zero of these counters via corresponding zero lines. Arbitration control unit 350 controls arbitration and grant of access in a manner not shown in FIG. 3 but better illustrated in FIG. 1.

Figure 4:
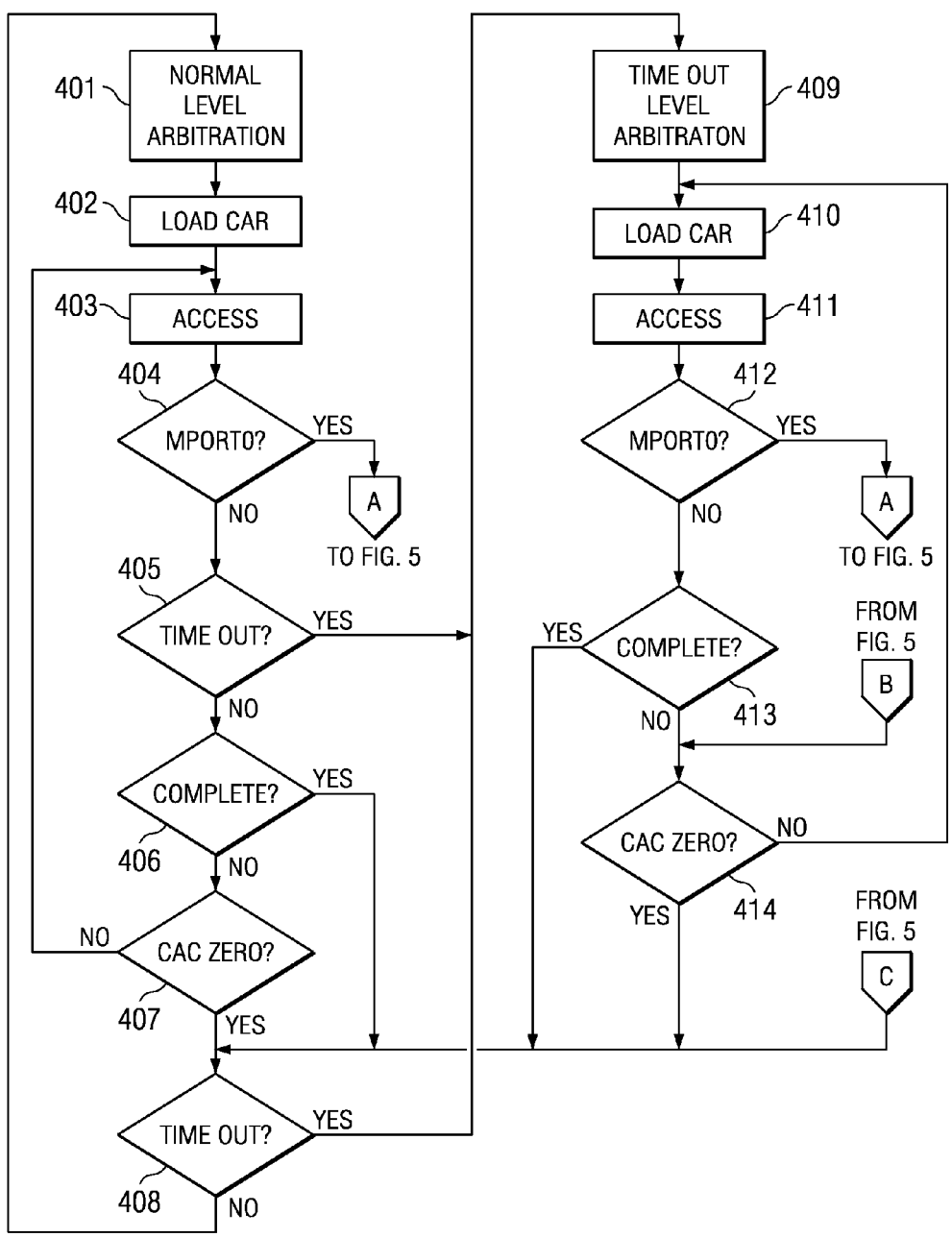
FIG. 4 is a flow chart illustrating some of the operations of the arbitration control unit illustrated in FIG. 3.

FIG. 4 illustrates a flow chart covering some of the operations of arbitration control unit 350. These operations noted are central to the operation of this invention. The flow chart of FIG. 4 is merely an outline of the operation of this invention. One skilled in the art would recognize that an operating embodiment would need various conventional additions that are not described here.

This flow chart begins with normal level arbitration block 401. Flow generally reaches this block because one or more of Mport1 102, Mport2 103 and Mport3 104 generates a normal priority level access request. Normal level arbitration block 401 selects one device and grants access to the selected device in the manner according to the least recently used (LRU) scheme previously described. Next block 402 loads consecutive access counter 341 with the data contents of CAR 311, CAR 315 or CAR 319 corresponding to the Mport granted access. In the preferred embodiment once loaded, CAC 341 counts down machine cycles until reaching zero. It is known in the art that the same time interval can be measured by counting up from zero to the count in the source register. In the preferred embodiment this consecutive access number stored CAR 311, CAR 315 or CAR 319 in is selectable as 1, 4, 8 or 16. Thus CAC 341 counts down from 1, 4, 8 or 16. Note that because CAC 341 operates only for the Mport granted access, there is no conflict in using a single CAC 341 for data sourced from CAR 311, TCAR 312, CAR 315, TCAR 316, CAR 319 and TCAR 320.

The corresponding IDLE register 313, 317 or 321 determines whether Mport accesses are considered sequential. In the preferred embodiment the IDLE registers 313, 317 and 321 may indicate 0, 2, 4 or 6 idle cycle between accesses for them to be considered sequential. This permits the system to handle cases where the requested accesses are not always sequential but are "bursty." Such bursty accesses occur in multiples with short idle periods between. The consecutive access counter 341 operates to count consecutive accesses as defined by the corresponding IDLE register of the accessing mPort.

The flow next makes a shared resource access at block 403. As explained above, each such access is considered in the consecutive access counter 341 depending on its relationship to the previous access. Test block 404 determines whether Mport0 101 generates an ultra priority access request. As previously described, Mport 101 has an ultra priority serviced at ultra priority level 210. If such an access request is received (Yes at test block 404), then the flowchart branches to another sequence illustrated in FIG. 5 via link A.

If no such ultra priority access request is received (No at text block 404), test block 405 determines if another Mport has timed out. Upon each access request by one of Mport1 102, Mport2 103 or Mport3 104 that is not granted access, the corresponding register PRT 314, PTR 318 or PTR 322 is loaded into its corresponding PTC 342, PTC 343 or PTC 344. Upon count down to zero by any of the priority time out counters 342, 343 or 344, a re-arbitration occurs at the time out priority level 220. Thus if a time out occurs (Yes at test block 405), flow goes to block 409 for a time out level 220 arbitration. This will be further described below.

If no time out occurs (No at test block 405), the flow goes to test block 405 which determines if the last access at block 403 was the final requested access, i.e. is the requested access complete. If so (Yes at test block 406), flow goes to test block 408 to test for a time out. This will be further described below.

If the requested access is not complete (No at test block 406), then the flow goes to test block 407. Test block 407 determines if the number of consecutive accesses set in the corresponding consecutive access register have occurred. If not (No at test block 407), flow returns to block 403 for the next access.

If the number of consecutive access has occurred (Yes at test block 407), then a re-arbitration occurs. Test block 408 determines if there is a pending time out by any other Mport. If not (No at text block 408), then the re-arbitration occurs at block 401. This arbitration occurs at the normal priority level 230. The Mport granted access depends on which are currently requesting access and the least recently used (LRU) history data. If no other Mport is requesting access, then the Mport of the prior access which was ended by the CAC count to zero is granted access. If another Mport requests access, then the Mport granted access is selected according to the LRU history.

If a time out has occurred (Yes at test 408), then the re-arbitration occurs at the time out priority level 220 in block 409. Block 409 only considers Mports making access requests that have timed out. This is arbitrated using the same LRU history as used for normal level priority 230 arbitration. Time out level arbitration block 409 selects one device and grants access to the selected device. Next block 410 loads consecutive access counter 341 with the data contents of TCAR 312, TCAR 315 or TCAR 320 corresponding to the Mport granted access. The value stored in one of the time out consecutive access registers can differ from the value stored in the corresponding consecutive access register. This feature could be used to grant greater consecutive access for the time out case because the device has been waiting for access.

The corresponding IDLE register 313, 317 or 321 determines whether Mport accesses are considered sequential as previously described. The consecutive access counter 341 operates to count consecutive accesses as defined by the corresponding IDLE register of the accessing mPort.

The flow next makes a shared resource access at block 411. As explained above, each such access is considered in the consecutive access counter 341 depending on its relationship to the previous access. Test block 412 determines whether Mport0 101 generates an ultra priority access request. If such an access request is received (Yes at test block 412), then the flowchart branches to another sequence illustrated in FIG. 5 via link A.

If no such ultra priority access request is received (No at text block 412), test block 413 determines if the last access at block 411 was the final requested access, i.e. is the requested access complete. If so (Yes at test block 413), flow goes to test block 408 to test for a time out. This will be further described below.

If the requested access is not complete (No at test block 413), then the flow goes to test block 414. Test block 414 determines if the number of consecutive accesses set in the corresponding consecutive access register have occurred. If not (No at test block 414), flow returns to block 410 for the next access.

If the number of consecutive access has occurred (Yes at test block 414), then a re-arbitration occurs. Test block 408 determines if there is a pending time out by any other Mport. If not (No at text block 408), then the re-arbitration occurs at block 401. This arbitration occurs at the normal priority level 230. The Mport granted access depends on which are currently requesting access and the least recently used (LRU) history data. If another Mport has timed out (Yes at test block 408), then this re-arbitration occurs at time out level arbitration 409 in the manner previously described.

Figure 5:
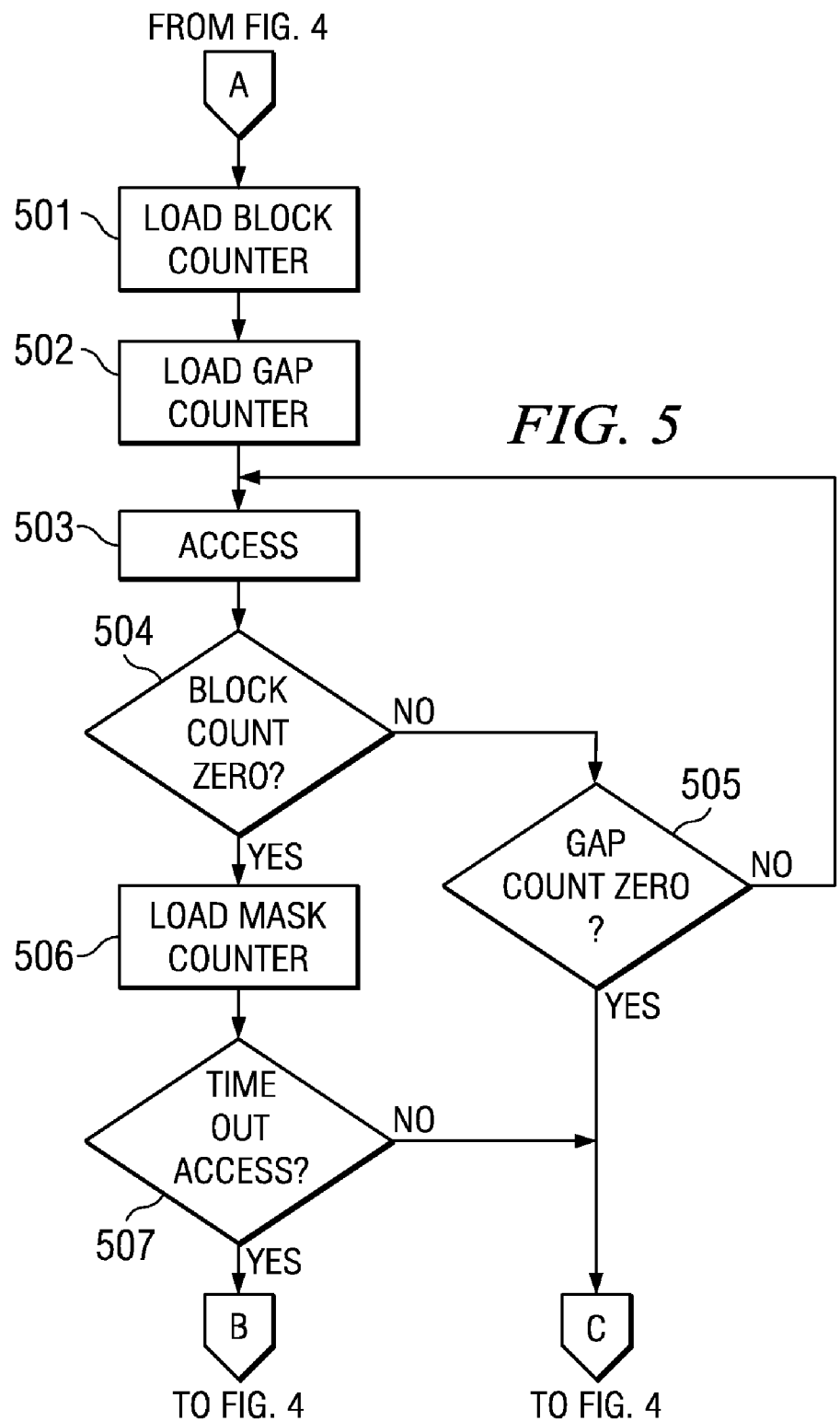
FIG. 5 is a flow chart illustrating some other operations of the arbitration control unit illustrated in FIG. 3.

FIG. 5 illustrates a flow chart of the operation of arbitration control unit 350 for ultra priority level 210 operations. As previously described, only Mport0 101 operates at the ultra priority level 210, so no arbitration is needed at ultra priority level 210. The flow chart of FIG. 5 is entered via link A from test block 404 or test block 412 of FIG. 4. Block 501 loads block counter 346 from block register 332. Block counter 346 counts the number of consecutive Mport0 accesses permitted before re-arbitration. This is similar to the consecutive accesses counted by CAC 341. Block 502 loads GAP counter 347 from GAP register 335. GAP counter 347 is enabled or disabled by the state of GAP enable bit 334. In the preferred embodiment, when GAP enable bit 334 is 0, GAP counter 347 is disabled and any break in accesses is counted as a block by block counter 346. When GAP enable bit 334 is 1, GAP counter 347 is enabled. GAP counter 347 counts idle cycles since the last access by Mport0 101. It is reset by re-loading from GAP register 335 upon each access by Mport0 101. In the preferred embodiment GAP register 335 can have the values 0, 64, 128 or 256

Flow next performs an access to shared resource 120 (block 503). Test block 504 determines if the block count is zero. This indicates that the number of block accesses specified in block register 335 have occurred. If this has not occurred (No at test block 504), then test 505 determines if the GAP counter is zero. A zero GAP counter means that a larger gap between block accesses has occurred than the number stored in GAP register 335. Note that if GAP counter 347 is disabled by GAP enable bit 334, then the GAP count is always zero. If the GAP count is not zero (No at text block 505), then block 503 performs another access. If the GAP counter was zero (Yes at test block 505), flow passes to test block 408 in FIG. 4 via link C. This provides a re-arbitration at normal level arbitration block 401 or time out level arbitration block 409 depending on whether there are any timed out Mports as determined by test block 408.

If the block count is zero (Yes at test block 504), then block 506 loads the value stored in Mask register 331 into mask counter 345. Mport0 101 cannot generate an ultra priority access request until expiration of the time measured by count in mask counter 345. This masking prevents Mport0 101 requests from taking too much bandwidth from the other Mports. In the preferred embodiment the value stored in Mask register 331 can be 0 and any integer from 2 to 2048. Note if Mask register 331 stores 0, Mport0 101 accesses are never masked and can interrupt any other access at any time.

Test block 507 determines if the past Mport0 101 access interrupted a time out priority level access. If so (Yes at test block 507), then flow passes to test block 414 in FIG. 4 via link B. This enables an interrupted time out priority level access to complete if not already completed as determined by test block 414. If not (No at test block 507), flow goes to test block 408 via link C. Test block 408 selects re-arbitration via normal level arbitration block 401 or time out level arbitration 409.

This invention uses the data access pattern of the ultra high priority requesting device. This invention assumes the ultra high priority device will perform consecutive reads or consecutive writes to a shared resource. Between each set of consecutive accesses, it will insert a maximum number of IDLE cycles. The real time requirement of this ultra high priority devide consists of doing a specific number of such consecutive accesses in a certain time interval. Three counters control this operation. When these counters roll over, they reload from a corresponding memory mapped register. Thus the technique is dynamically reconfigurable. The invention implements the following algorithm:

(1) Block counter and Mask counter are initially loaded with their default counts (from respective memory mapped registers).

(2) Ultra high priority accessor performs a set of consecutive accesses.

(3) As soon as a single idle is detected, it is assumed that it is the end of a block and the Block Counter is decremented. If Block counter has expired (=0), then go to 5, else continue.

(4) If more than n idles (where n may be 0, 64, 128 or 256 based on configured value in memory mapped register) are detected since the last access, the logic assumes the sequence of consecutive blocks is over. This reverts to normal operation opening arbitration to remaining accessors. Otherwise, if less than of equal to n idles have occurred and another access begins, the arbiter goes back to step (2). The logic does not allow access from any other device while the n idle cycles are being counted.

(5) If Block counter is 0, then the maximum number of consecutive blocks has occurred. Mask counter 345 begins counting and any further accesses from the ultra high priority accessor is ignored. Arbitration proceeds among the remaining devices.

(6) As long as mask counter 345 has yet reached 0, the ultra high priority device remains masked.

(7) When mask counter 345 equals 0, then it is once again given highest priority. The algorithm begins again at step (1).

The advantage of this invention is that it is software programmable as well as dynamically reconfigurable and hence it can be controlled as to how long the ultra high priority device will be allowed to remain in highest priority and the duration for which it can be masked off. It is possible to tune the system needs based on real time requirements of all the devices. Because the scheme can be configured to tailor itself specifically to the access pattern of the ultra high priority device for a particular usage condition of the SOC, it achieves more optimal throughput for both the ultra high priority device and all other devices and is adaptable to different usage conditions.

What is claimed is:

1. A method for arbitration among a plurality of devices for a shared resource, comprising the steps of:
designating one device as an ultra high priority device;
granting access to the shared resource to one requesting device at a time including granting access to the ultra high priority device if the ultra high priority device requests access; and
upon granting access to the ultra high priority device limiting access of the ultra high priority device to a selectable number of block accesses and a selectable number of consecutive idle cycles between block accesses and thereafter prohibiting the ultra high priority device from requesting access for a selectable interval of time during which access may be granted to other devices.

2. The method of claim 1, further comprising the step of:
storing a block count in a block count register; and
wherein said step of limiting access of the ultra high priority device to a selectable number of block accesses includes stopping access by the ultra high priority device after a number of block accesses corresponding to the stored block count.

3. The method of claim 2, wherein:
said step of stopping access by the ultra high priority device after a number of block accesses corresponding to the stored block count includes counting each block access until the number equals number corresponding to the stored block count.

4. The method of claim 3, wherein:
said step of counting each block access includes loading the stored block count in a block counter, decrementing a count in the block counter for each block access and stopping access when the count in the block counter reaches zero.

5. The method of claim 2, wherein:
said block count register is a memory mapped register; and
said step of storing a block count in the block count register includes writing the block count into memory at an address corresponding to a memory mapped address of the block count register.

6. The method of claim 1, further comprising the step of:
storing a gap count in a gap count register; and
wherein said step of limiting access of the ultra high priority device to selectable number of consecutive idle cycles between block accesses includes counting a number of consecutive idle operating cycles between ultra high priority device block accesses to the shared resource and ending the ultra high priority device access when the number of consecutive idle operating cycles equals the gap count.

7. The method of claim 6, wherein:
said step of counting consecutive idle operating cycles includes loading the stored gap count in a gap counter, decrementing a count in the gap counter for each consecutive idle operating cycles between ultra high priority device block accesses to the shared resource and ending access when the count in the gap counter reaches zero.

8. The method of claim 6, wherein:
said gap count register is a memory mapped register; and
said step of storing a gap count in the gap count register includes writing the gap count into memory at an address corresponding to a memory mapped address of the gap count register.

9. The method of claim 6, wherein:
said step of limiting access of the ultra high priority device to selectable number of consecutive idle cycles between block accesses includes resetting said gap counter to zero upon each ultra high priority device block access.

10. The method of claim 1, further comprising the step of:
storing a mask count in a mask count register; and
wherein said step of prohibiting the ultra high priority device from requesting access for a selectable interval of time includes counting a number of operating cycles following prohibiting ultra high priority device access to the shared resource and permitting the ultra high priority device to request access when the number of operating cycles equals the mask count.

11. The method of claim 10, wherein:
said step of counting consecutive operating cycles includes loading the stored mask count in a mask counter, decrementing a count in the mask counter for each operating cycle and permitting access when the count in the mask counter reaches zero.

12. The method of claim 10, wherein:
said mask count register is a memory mapped register; and
said step of storing a mask count in the mask count register includes writing the mask count into memory at an address corresponding to a memory mapped address of the mask count register.

13. The method of claim 1, wherein:
said step of granting access to the shared resource includes granting the ultra high priority device requests access interrupting access by another device if another device is accessing the shared resource; and further comprising the step of upon granting access to one device not the ultra high priority device following said selectable number of ultra high priority device block accesses or said selectable number of consecutive idle cycles between block accesses resuming an interrupted access by another device.

* * * * *